United States Patent
Kakaire

(10) Patent No.: US 12,126,394 B2
(45) Date of Patent: Oct. 22, 2024

(54) MOBILE WIRELESS BROADBAND NETWORK INTERFACE CARD (MWBNIC) AND K-NET

(71) Applicant: Galactic Telecom Group, LLC, Silver Spring, MD (US)

(72) Inventor: James Kirunda Kakaire, Silver Spring, MD (US)

(73) Assignee: GALACTIC TELECOM GROUP, LLC, Silver Spring, MD (US)

( * ) Notice: Subject to any disclaimer, the term of this patent is extended or adjusted under 35 U.S.C. 154(b) by 0 days.

(21) Appl. No.: 17/767,871

(22) PCT Filed: Apr. 14, 2020

(86) PCT No.: PCT/US2020/028144
§ 371 (c)(1),
(2) Date: Apr. 8, 2022

(87) PCT Pub. No.: WO2021/071551
PCT Pub. Date: Apr. 15, 2021

(65) Prior Publication Data
US 2023/0344532 A1  Oct. 26, 2023

Related U.S. Application Data

(60) Provisional application No. 62/913,360, filed on Oct. 10, 2019.

(51) Int. Cl.
*H04B 17/318* (2015.01)
*H04L 49/111* (2022.01)
(Continued)

(52) U.S. Cl.
CPC ........ *H04B 17/318* (2015.01); *H04L 49/111* (2022.05); *H04L 49/9068* (2013.01); *H04W 36/326* (2023.05)

(58) Field of Classification Search
None
See application file for complete search history.

(56) References Cited

U.S. PATENT DOCUMENTS

| | | | |
|---|---|---|---|
| 2006/0148409 A1* | 7/2006 | Jansen | H04B 17/318 455/67.11 |
| 2008/0192696 A1 | 8/2008 | Sachs et al. | |

(Continued)

FOREIGN PATENT DOCUMENTS

| | | | |
|---|---|---|---|
| JP | 2009-503991 A | 1/2009 | |
| JP | 2017-058787 A | 3/2017 | |

(Continued)

OTHER PUBLICATIONS

International Search Report and Written Opinion in International Application No. PCT/US2020/028144, mailed Oct. 10, 2019 (7 pages).

(Continued)

*Primary Examiner* — Adolf Dsouza
(74) *Attorney, Agent, or Firm* — NIXON PEABODY LLP

(57) ABSTRACT

A Mobile Wireless Broadband Network Interface Card (MWBNIC) for networking electronic devices on a wireless broadband spectrum. The MWBNIC is built into electronic devices as a connecting modem or plugged in via external device ports such as USB. A microprocessor chip attached to a circuit board with a network packet controller coupled to a dedicated cache memory utilized to temporarily store the last N data packets from a node for networking WIFI maintains packet continuity. The network comes with protocols that control packet processing. The MWBNIC embedded packet control protocol (PCP) pushes, pops, compares and deletes packets from cache when a device is in motion. The PCP is connected to a mechanism for determining bandwidth on nodes, another mechanism for switching frequency to that of the next K-Node to connect (Continued)

to and a pre-determined connectivity data set that directly connects the modem in motion are means for networking broadband spectrum.

6 Claims, 10 Drawing Sheets

(51) Int. Cl.
*H04L 49/90* (2022.01)
*H04W 36/32* (2009.01)

(56) References Cited

U.S. PATENT DOCUMENTS

| | | |
|---|---|---|
| 2012/0163345 A1 | 6/2012 | Camarillo et al. |
| 2017/0078436 A1 | 3/2017 | Ishihara et al. |
| 2018/0227828 A1 | 8/2018 | Sirotkin |
| 2019/0124511 A1 | 4/2019 | Sirotkin |

FOREIGN PATENT DOCUMENTS

| | | |
|---|---|---|
| RU | 2631972 C1 | 9/2017 |
| WO | WO 2017/078657 A1 | 5/2017 |
| WO | WO 2018/119153 A2 | 6/2018 |

OTHER PUBLICATIONS

Office Action in Kenyan Application No. KE/P/2021/3916, mailed Jan. 19, 2023 (5 pages).
Office Action in Russian Application No. 2022112498, mailed Mar. 31, 2023, with machine translation (24 pages).
Office Action in Moroccan Application No. 56735, mailed Sep. 5, 2022, with machine translation (8 pages).
Notice of Reasons for Refusal in Japanese Application No. 2022-521254, mailed Mar. 20, 2023, which machine translation (15 pages).

* cited by examiner

PRE-DETERMINED NODE TO CONNECT TO BASED ON DEVICE COORDINATE AND DIRECTION

600

4

| GATEWAY 1 | WAN 2 | Gwahanza (LAN) 3 | K-NODE 4 | DEVICE COORDINATE 5 | DIRECTION 6 | NEXT K-NODE 7 | NODE DISTANCE 8 |
|---|---|---|---|---|---|---|---|
| 220 | 155 | 15520 | 16 | (X.Y.Z) | NNE (22°) | 18 | XX |

FIG 6

MOBILE WIRELESS BROADBAND NETWORK INTERFACE CARD (MWBNIC) AND K-NET

BACKGROUND OF PRIORITY

This patent application claims the benefits of provisional application number U.S. 62/913,360. It was originally filed as a provisional application on Oct. 31, 2016 with a letter explaining circumstances that surrounded it. It was filed as a PCT on Oct. 31, 2017 and was assigned the number PCT/US17/59329. It was re-filed on 21 Dec. 2018 as a PCT and accorded a serial Number PCT/US2018/067218 under the title Rep Mobile Wireless Broadband Network Interface Card (MWBNIC) & K-Net. PCT/US2018/067218 was not revivable because office communication was not received from the RO.

FIELD OF THE INVENTION

The present invention relates to networking of wireless devices over broadband spectrum including Wi-Fi. In particular, the invention provides a Mobile Wireless Broadband Network Interface Card (MWBNIC) with packet control methods and three protocols for maintaining packet order and continuity for devices in motion and stationary on a network. The network is comprised of the Gwahanza Locol Area Network Manager which runs the Network Control Protocol (NCP), a special router known as K-Node which runs the Card Control Protocol (CCP) and servers all connected by high speed transmission wires such as fiber optics. The third protocol, the Packet Control Protocol (PCP) runs from the mobile wireless broadband network interface card that is installed in devices or plugged in device external ports. The protocols facilitates authentication, node switching while in motion and data transmission on the network. A Net Extender device which is part of the network is embedded with a Card Control Protocol and acts like an independent K-Node providing access to other devices.

BACKGROUND OF THE INVENTION

Prior Art

There are many network cards on the market today that provides wireless connectivity. Those cards are inserted into laptops or desktop computers for use when in localized areas. They connect to one wireless access point to get service within a limited radius. They cannot network (connect) data from two sources and maintain connectivity while in motion.

Cellular phones have mobility over long distances but they operate on narrow bandwidth spectrums that have limited data transfer capacities. Bigger devices such as televisions in motion cannot function with the cellular narrow band to provide real time service.

Signal propagation in the current network cards and cellular products is comparable to a tree with falling leaves where several people can stand under the tree with baskets and collect the leaves (signal).

Problems Solved

Cellular technology operates on narrow bandwidth and has no security. Thus there exists a need for a solution that networks mobile devices on Wi-Fi networks and other broadband spectrums to maintain connectivity and data flow while in motion or stationary.

Advantages of the Invention

Advantages of this system are that it networks mobile devices on Wi-Fi and other broadband spectrums while providing security to the devices by utilizing a changing connection code that secures a connection to prevent intrusion and mobile device diversion to rogue nodes.

SUMMARY OF THE INVENTION

The present invention introduces the Mobile Wireless Broadband Network Interface Card (MWBNIC) that connects to more than one wireless data sources (K-Nodes) simultaneously and network the data. It maintains data packet order and continuity when a device is in motion and switching from one wireless data source to another. This allows a device with this card to move a long distance connecting from one wireless broadband K-Node to another without losing connectivity. The wireless K-Nodes may be viewed as access points.

In one implementation, the MWBNIC connects automatically to different nodes each through a different frequency filter establishing more than one simultaneous connections while in another implementation, the device is instructed to connect to a particular node. A connection code provided to both the device in motion and the node enhances security. Data flow, network range check, and signal strength check takes place concurrently.

As a system, the card comes with a special wireless router, the K-Node connected by high speed wires to a Local Area Network Manager known as Gwahanza which also connects to servers by high speed wires.

Unlike the current wireless cards and cellular products that do not protect data signal, the broadband card in this invention receives targeted data from the Gwahanza Local Area Network Manager. One cannot station a non-authorized access point to lure the card into connecting to it because the card must provide a connection code appended to the connection request along with the device identity to the Gwahanza Local Area Network Manager before it is authenticated.

The connection code which originates from the Gwahanza changes at every connection so one cannot duplicate it. When the connection code is generated by the Gwahanza and provided to the MWBNIC, it is also saved on the server under the identity of that MWBNIC. A connection request by the MWBNIC is sent with the connection code appended to it for comparison with the one retrieved from the server. This creates a very secure wireless network.

The next K-Node to connect to compares the connection request submitted by the device to the connection request submitted by the Gwahanza Local Area Network Manager and authenticates the device to switch to the K-Node.

The Gwahanza set forth determines the next node for a MWBNIC to connect to based on wavelength at which the wireless K-Node is communicating. Wave length lamda (A.) and frequency (f) relates according to the formula $\Lambda = c/f$ where c is the speed of light.

The MWBNIC which networks data from more than one source receives data packets from multiple nodes via at least one input port. It saves the data packets from each node instantaneously utilizing at least one data structure preferably a stack. A few packets are written to each data structure each time. The N data packets are simultaneously deleted from the oldest data structure. Alternatively, this is cached in the random access memory. Only the last N packets are preserved each time for comparison to data coming from a new wireless K-Node. The previous N data packets are deleted as new ones come in to replace them.

Data is divided into two main categories namely networking and user device service data. The user service data is subdivided into categories specifying the types of data being transmitted. Packets in each category are received at different frequencies which are assigned specific communication ports. This allows for all services to flow simultaneously without interference.

The MWBNIC is built into many electronic devices as a modem. These includes mobile phones, tablets, laptop computers, automobiles, home televisions, car televisions, cameras, navigation devices and any other that requires wireless networking to access broadband spectrum such as Wi-Fi. This enables a user to watch live television or video conference on Wi-Fi while in motion. It is also built as a plug and play modem inserted into external device ports to deliver service.

The present invention is a system that combines a Mobile Wireless Broadband Network Interface Card (MWBNIC) and a wireless network on which it runs. The MWBNIC networks moving devices over broadband spectrum. The system comes with three protocols for maintaining packet order and continuity for devices in motion and stationary on a network. The network is comprised of the Gwahanza Local Area Network Manager which runs the Network Control Protocol (NCP), a special router known as K-Node which runs the Card Control Protocol (CCP) and servers all connected by high speed transmission wires such as fiber optics. The third protocol, the Packet Control Protocol (PCP) runs from the mobile wireless broadband network interface card that is installed in devices or plugged in device's external ports. The protocols facilitates authentication, node switching while in motion and data transmission on the network. A Net Extender which is part of the network acts like an independent K-Node providing access to other devices. The devices include but not limited to televisions, tablets, phones, computers, cars, home and office accessories.

The type of request field in the TCP header was incorporated to include connections with different retransmit rates after unsuccessful transmission.

Under this invention however, we use type of request to give precedence to some devices over others that may not have critical need for connection. A self driving automobile for example is given a higher priority over a phone seeking connection when there is a bandwidth issue.

BRIEF DESCRIPTION OF THE DRAWINGS

FIG. 5 differs from FIG. 4 in that FIG. 5 provides three options for switching a device that is getting out of range of the currently connected node. One is based on connection frequency, the second on signal strength which is read directly by the card from the K-Nodes and the last option is based on distance which provides the next node to connect to from predetermined values stored on the card or read from the Gwahanza LAN manager. The mobile wireless broadband network interface card reads pre-determined and tabulated positions data which provides it with the next node to connect to based on its calculated distance and coordinates FIG. 6 is a representation of a data structure in a tabular form. The data structure could be a harsh table, list or other that stores easily accessible data. It is used in conjunction with the algorithm of FIG. 5. In one implementation, data resides on the device and in another implementation, data is retrieved from the Gwahanza network manager or server on the network.

DETAILED DESCRIPTION OF THE INVENTION

As used herein, K-Node in this specification refers to a special wireless router that provides network connection to a device whether in motion or stationary. The K-Node is connected to the network manager named Gwahanza by wires. Gwahanza which is the Local Area Network (LAN) Manager is connected to servers by high speed wires such as fiber optics.

K-Net refers to the system that combines the network and devices that connects to it over broadband spectrum. K-Net, which is a broadband network is comprised of special wireless routers known as K-Nodes and net extenders. The net extenders which are built with a booster to amplify signal, wirelessly connects to K-Nodes and provides service to other devices remotely. The K-Nodes connects to the Gwahanza Local Area Network Manager by wire and the Gwahanza connects to servers by wires.

The K-Net further comprises of application monitors, repeaters, authentication servers, Internal DNS servers (IDNS), IP allocation servers, firewalls, Gateway to the internet all connected by wires such as fiber optics that delivers high speed data transmission. A combination of all these with the three protocols makes the network function.

The Wireless Broadband Network Interface Card is built with at least one external port that connects to cable including fiber optics and Ethernet where data is transmitted as electronic pulse over the cable when plugged to an outlet.

Figure 1:
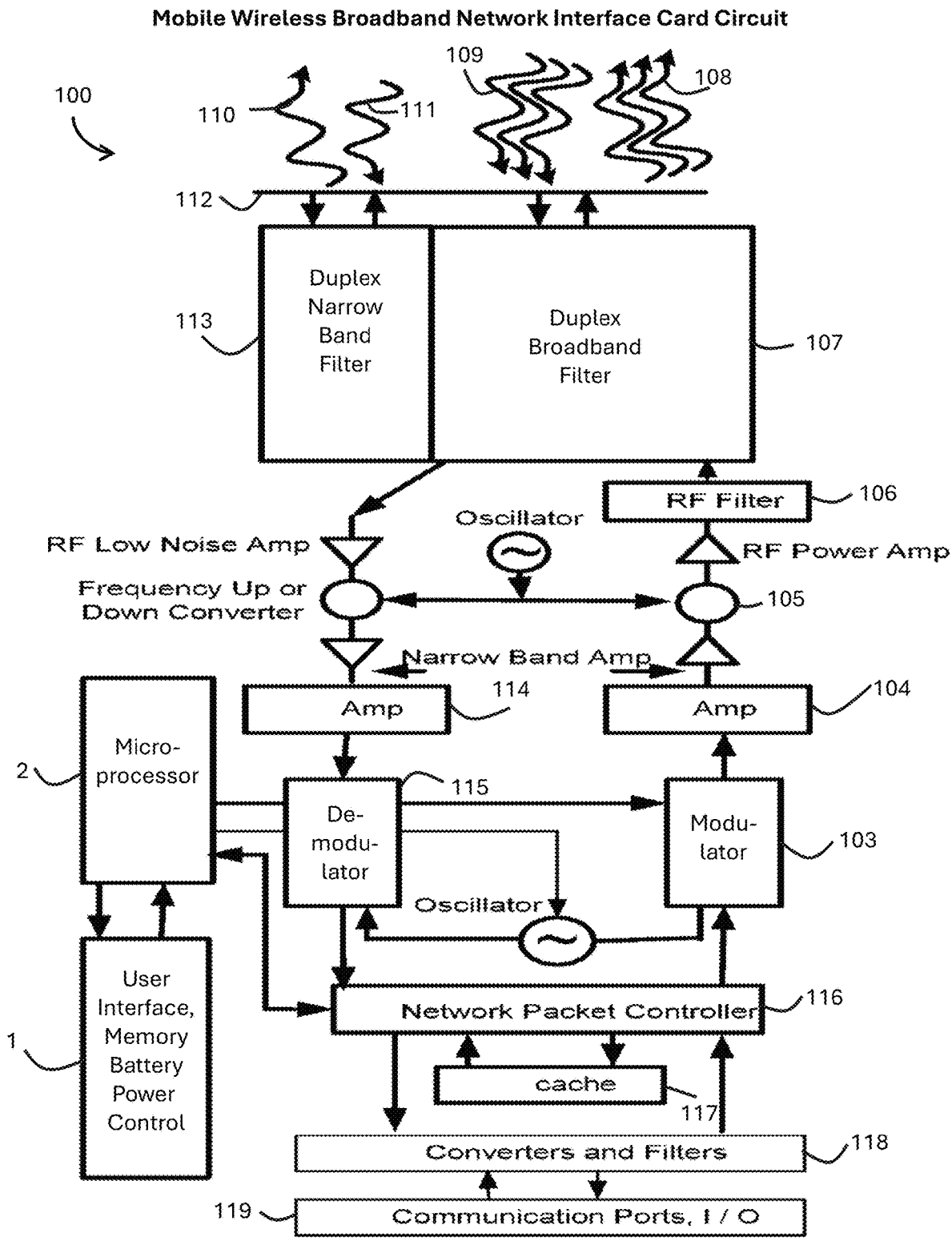
FIG. 1 illustrates a circuit board of the Mobile Wireless Broadband Network Interface Card (MWBNIC) of an embodiment of the present invention. The design allows both broadband and narrow bandwidth to provide data.
Figure 2:
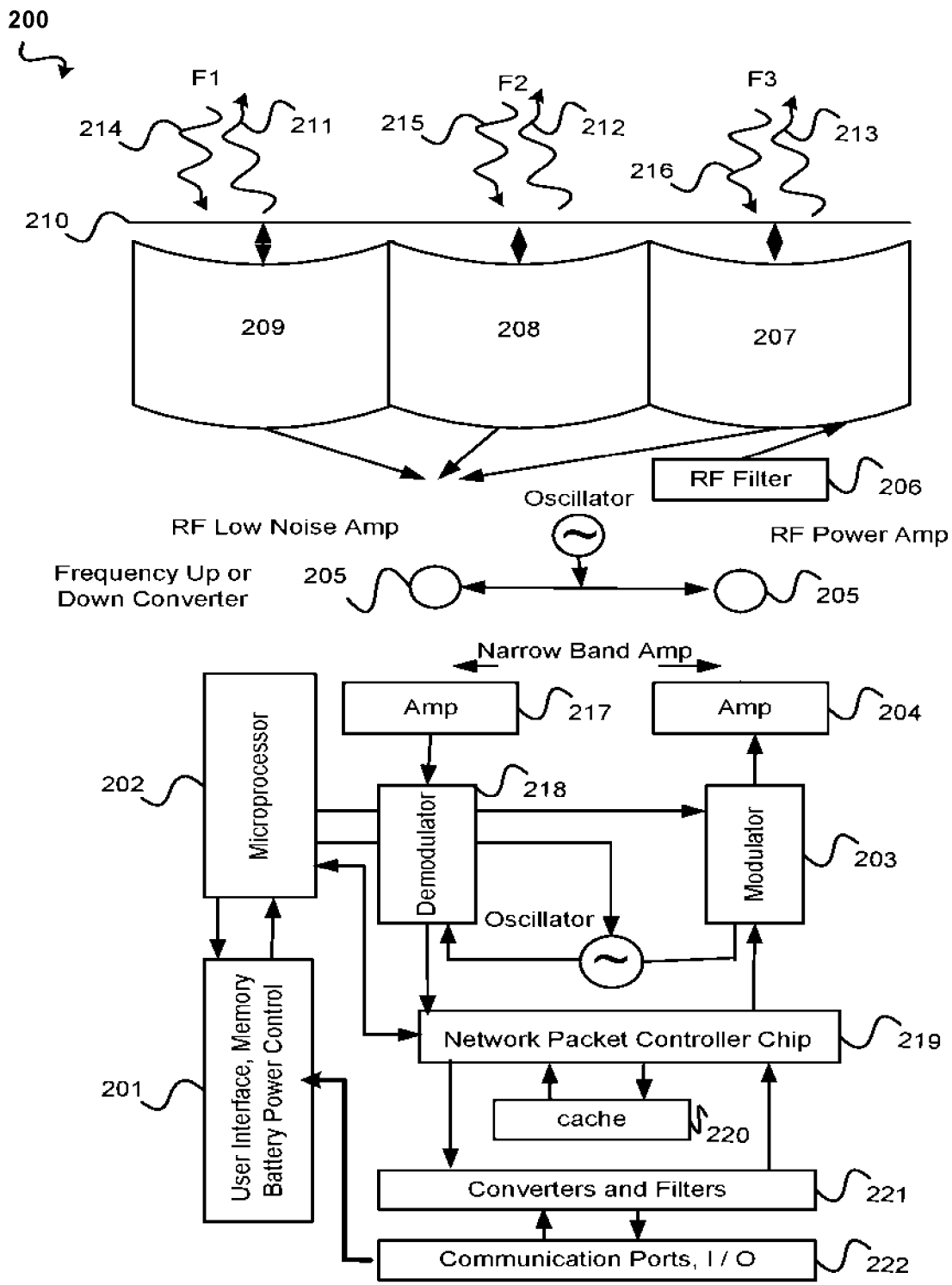
FIG. 2 is a variation of FIG. 1. It shows how data packets flow in at different frequencies and gets filtered from each of the three filters separately. Each filter processes a specific range of frequencies that are transmitted by a node emitting connection data at those particular frequencies.
Figure 3:
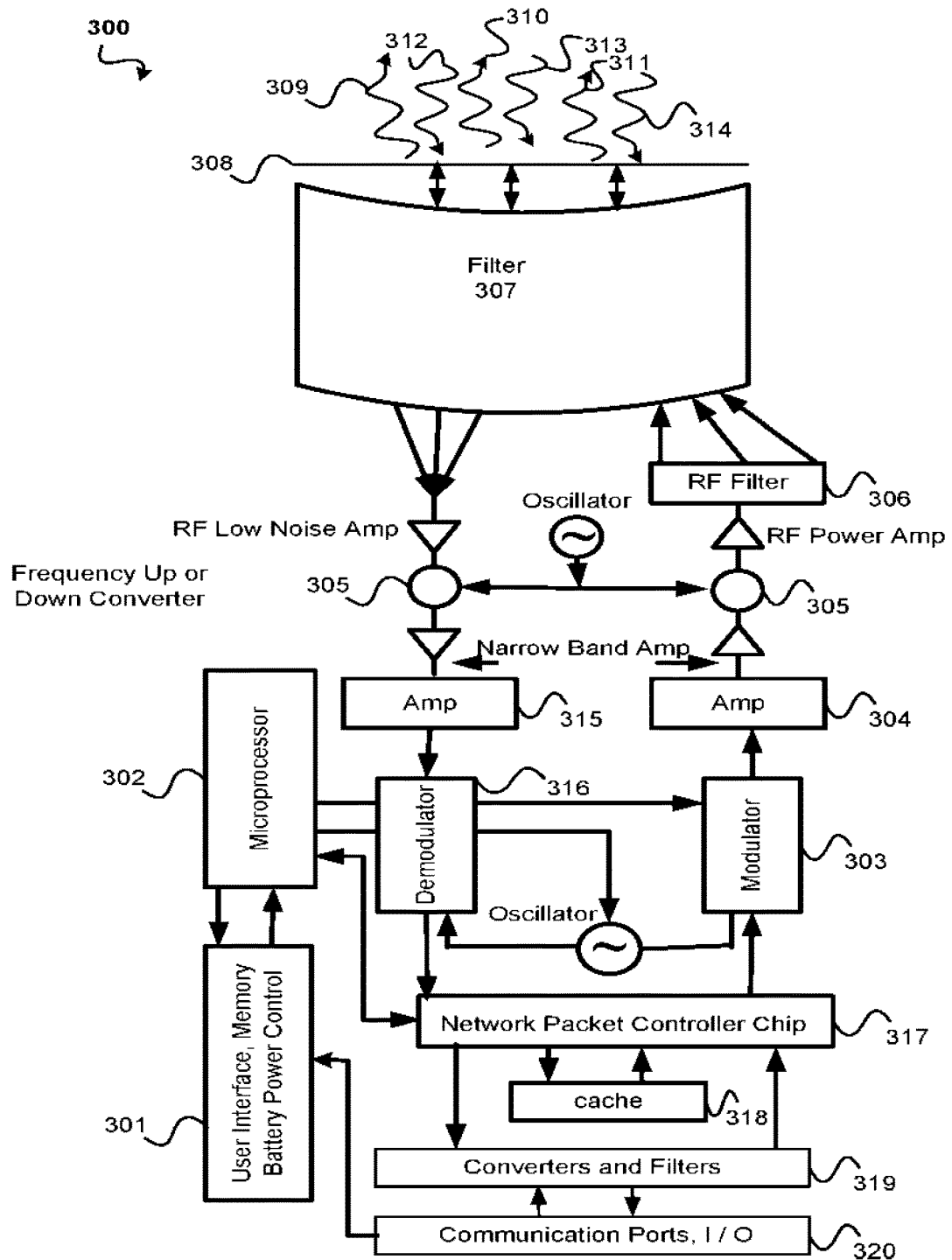
FIG. 3. Is another variation of FIG. 1. It shows how data packets at various frequencies gets into the MWBNIC card through one filter that allows only the authorized frequencies. The unauthorized frequencies are ignored.

FIG. 2 and FIG. 3 slightly differs from FIG. 1. The features in FIG. 2 and FIG. 3 that differs from FIG. 1 are the only one's explained.

The mobile wireless broadband network interface card of the current invention is built into and installable in multiple auxiliary devices including mobile phones, tablets, laptop computers, televisions, navigation devices and vehicles as a connecting modem that networks on broadband wireless or Wi-Fi nodes. A plug and play version of the modem is build for external ports such as USB.

Figure 7:
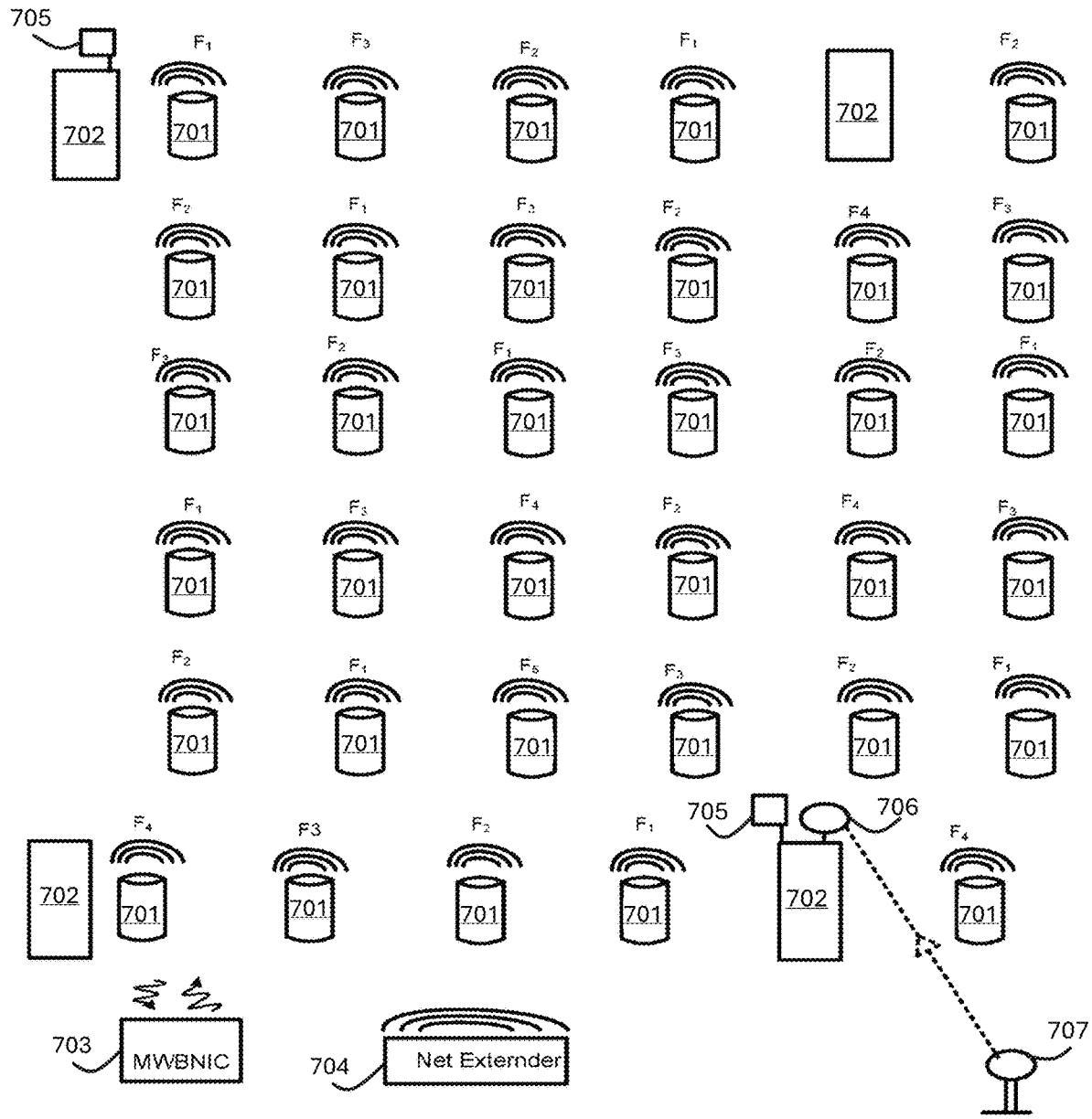
FIG. 7 shows a Wi-Fi network referred to as the K-Net. It is comprised of wireless K-Nodes coupled to Gwahanza Local Area Network Managers by wires (not shown). Gwahanzas are in turn connected to servers (not shown) by wires. The figure also shows Net Extenders, MBWNIC card based device and an antenna that harvests free television channels from the air into the K-Net.
Figure 8:
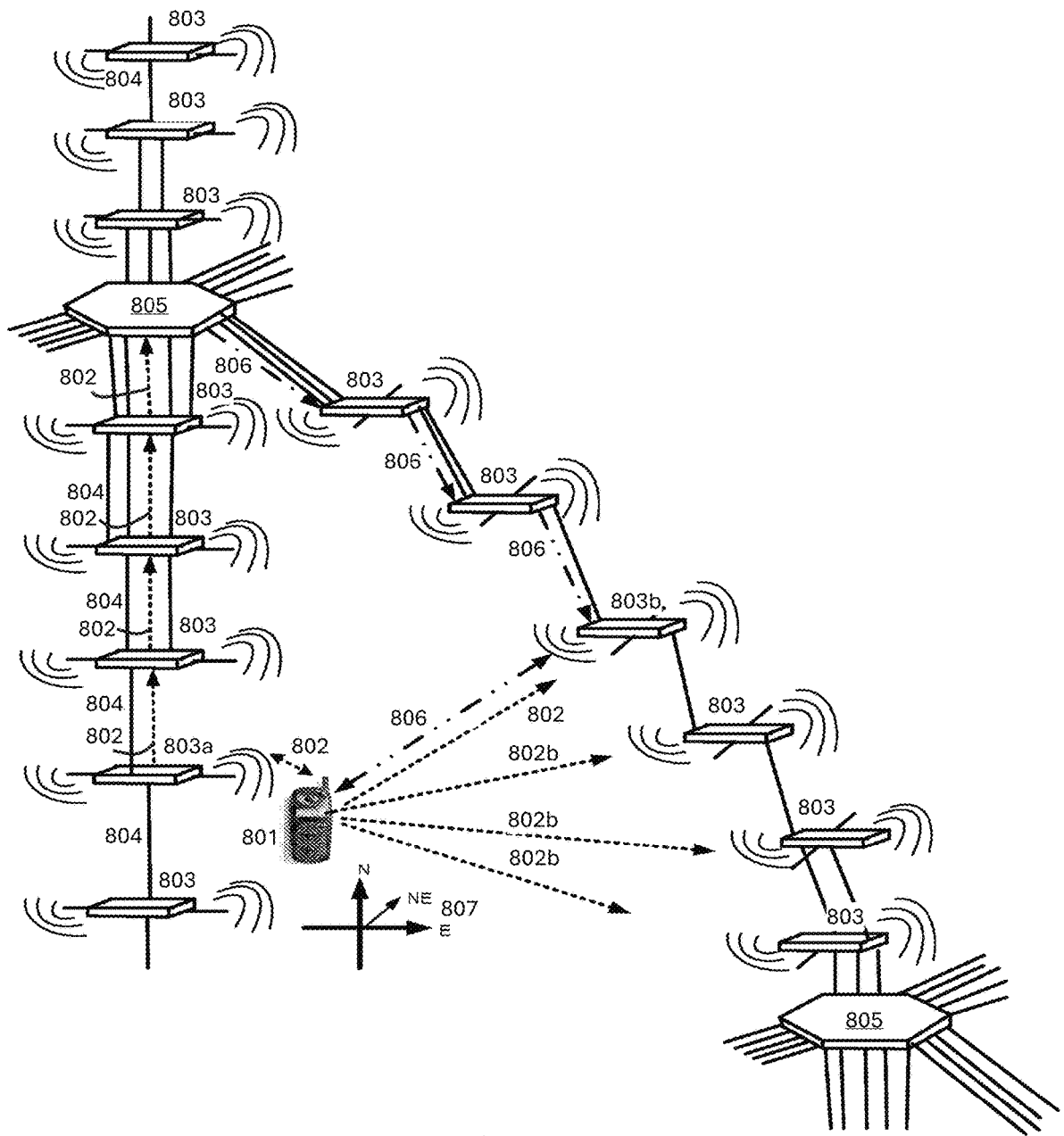
FIG. 8 is a sectional representation of the network to which the Mobile Wireless Broadband Network Interface Card connects. Each wireless K-Node is directly connected to the Gwahanza Local Area Network Manager by wire.

FIG. 1 is a diagram of the critical embodiments of the present invention. It represents a Mobile Wireless Broadband Network Interface Card (MWBNIC) for networking electronic devices and broadband nodes to deliver data on Wi-Fi and cellular networks as seen in FIGS. 1,7 and 8. It comprises of a circuit board and wireless radio antennas for wirelessly interfacing with the special wireless broadband routers known as K-Nodes that are connected to the Gwahanza LAN managers and servers by wires.

The User, memory and power Interface 1, is the input of the initial commands such as power on that sends signals to the processor 2 to execute and initiate connectivity and data flow. The modulator 3, converts the digital commands from the processor 2, into analog signal for transmission wirelessly to a K-Node (not shown). The Wireless Broadband Network Interface Card modem 100 converts out going digital data into a form that is transmittable over the airwaves. The K-Node converts it back to digital and then electrical signal and submits to the Gwahanza LAN Manager via wire.

The frequency up or down converter 105, ensures the frequency in use at the node is the same as the transmission frequency within the card. The modulated data signal is then merged with the transmission wave. The RF filter 106, ensures transmission takes place without extraneous signal.

The duplex broadband filter 107 coupled to the wireless radio antennas 112, is a two way filter that ensures outgoing data is what it is meant to be and the incoming data is at the right frequency or frequency range. The outgoing data signals 108, are wirelessly transmitted to a K-Node (not shown). The duplex broadband filter 107 is dual mode meaning it filters narrow band below 2.4 GHz and broad band 2.4 GHz-5.x GHz, Microwaves and Infrared utilized one at a time. Amplifiers 104, 114 are utilized to enhance incoming 111, 109 and outgoing signal 110, 108.

The MWBNIC 100 embedded packet control protocol (PCP) pushes, pops, compares and deletes packets from cache 117 when a device is in motion. The PCP is connected to a mechanism for determining bandwidth on nodes, another mechanism for switching frequency to that of the next K-node and a predetermined connectivity data set that directly connects devices in motion. These are means for networking. The Gwanhanza data set is downloaded to devices.

Part 113 filters narrow bands 110 out and narrow bands 111 in. Narrow band includes cellular signals. Either the broadband part 107 is active or the narrow band part 113 but not both at the same time. The incoming broadband signal 109 from a wireless K-Node and all other signals pass through the antennas 112 coupled to the duplex filters 107,113.

A demodulator 115, is utilized to convert incoming signal 109 into digital for processing. The data packets transmitted to the wireless broadband Network Interface card are received via at least one input port and converted to digital format for use by the device in which it is installed The Network Packet Controller Chip 116, with an embedded Packet Control Protocol manages connectivity and data transmission within the Mobile Wireless Broadband Network Interface Card 100. It executes from the Network Packet Controller Chip 116 in the MWBNIC 100 and identifies data packets by packet ID wherein, the next packet selected for processing has an id of a higher magnitude than the packet from the previous K-Node.

The Network Packet Controller Chip 116 is coupled to a processor 102 and dedicated cache 117 temporarily stores networking and service data when a device is in use. Networking data is all stored in data structures such as stacks in the cache 117. Service data is stored in queues and other data structures that provide first-in first-out order. The last few N data packets on the last stack of one K-Node (special router) is utilized for comparison to ensure packet order and data continuity when networking data from two different K-Nodes. Networked data delivered to electronic devices in motion or stationed via the MWBNIC 100 includes narrow and broadband spectrums.

The networking data packets transmitted to the wireless broadband Network Interface card 100 are received via at least one input port 119 and converted to digital format for use by the device in which it is installed.

The Wireless Broadband Network Interface Card 100 converts outgoing digital data into a form that is transmittable over the airwaves and this form includes radio waves, microwaves and infrared.

The converters and filters 118, ensures outgoing and incoming signal from input/output 119 is filtered and converted to analogue or digital as needed. A plurality of data ports 119 coupled to the processor 102 modulator 103 and demodulator 115 through the Network Packet Controller Chip 116 allows for interaction with the networked devices.

In the primary implementation method, the Gwahanza Local Area Network Manager connected to the wireless K-Nodes (special routers) by physical wires such as fiber optics controls connectivity and K-Node switching. In the secondary method, the Mobile Wireless Broadband Network Interface Card controls its own connections and switching of nodes.

When implemented to control network connectivity and switching of nodes independently, the Mobile Wireless Broadband Network Interface Card 100 is embedded with a mechanism for determining signal strength of nodes in range. This is coupled to the Network Packet Controller Chip 116 and processor 102 for switching nodes and maintaining data continuity.

In another implementation, every other K-Node operates at different frequencies from that of the neighboring K-Node. Networking data packets of the wireless broadband network interface card 100 are received from every other node at specific frequencies. The card 100 easily finds the next K-Node to connect to based on frequency at which the K-Node communicates. The frequency up or down converter 105 coupled to the Network Packet Controller Chip 116 accomplishes the task of switching to frequency of the next K-Node to be connected to. The process is automated. The spectrum whose frequencies are utilized includes radio waves, microwaves and infrared. One or more filters 107, 113 are utilized to establish more than one simultaneous connection.

The software that runs the card 100 contains a table or log with all K-Node and Gwahanza locations in each sub Wide Area Network (SWAN) and their predetermined values of coordinates or positions for each short distance such as one meter or less. The values provide the next K-Node to connect to based on a device's distance and coordinates. The table of nodes is automatically updated.

The Gwahanza which manages connected devices, instructs devices with the MWBNIC 100 to connect to specific K-Nodes as they move from one location to another. The K-Node to connect to next depends on signal strength relative to direction of motion of the device. Communication frequency of the K-Node is utilized by the Gwahanza in making the K-Node selection in one implementation.

The log or table in the card is kept on the Gwahanza Local Area Network Manager but at a much wider level covering a very large area of LANs.

To calculate position and coordinates of a device relative to K-Nodes, the algorithm in both the Packet Control Protocol and Network Control Protocol utilize time to leave (TTL) from the connecting device and arrival time (AT) to obtain the signal travel time by subtracting AT−TTL. It multiples this by the signal speed to obtain the device distance from each K-Node in the vicinity. The Gwahanza LAN manager or the MWBNIC 100 utilize the pre-calculated and tabulated data in a log to specify which next K-Node to connect to.

In the implementation where the card 100 decides which next K-Node to connect to, the card 100 reads logs and choose the next K-Node. The protocol on the Mobile Wireless Broadband Network Interface Card 100 is upgraded periodically as the device is moved from one area to another.

Alternatively the next K-Node is determined by calculations using distances between the device and node instead of logs.

Figure 10:
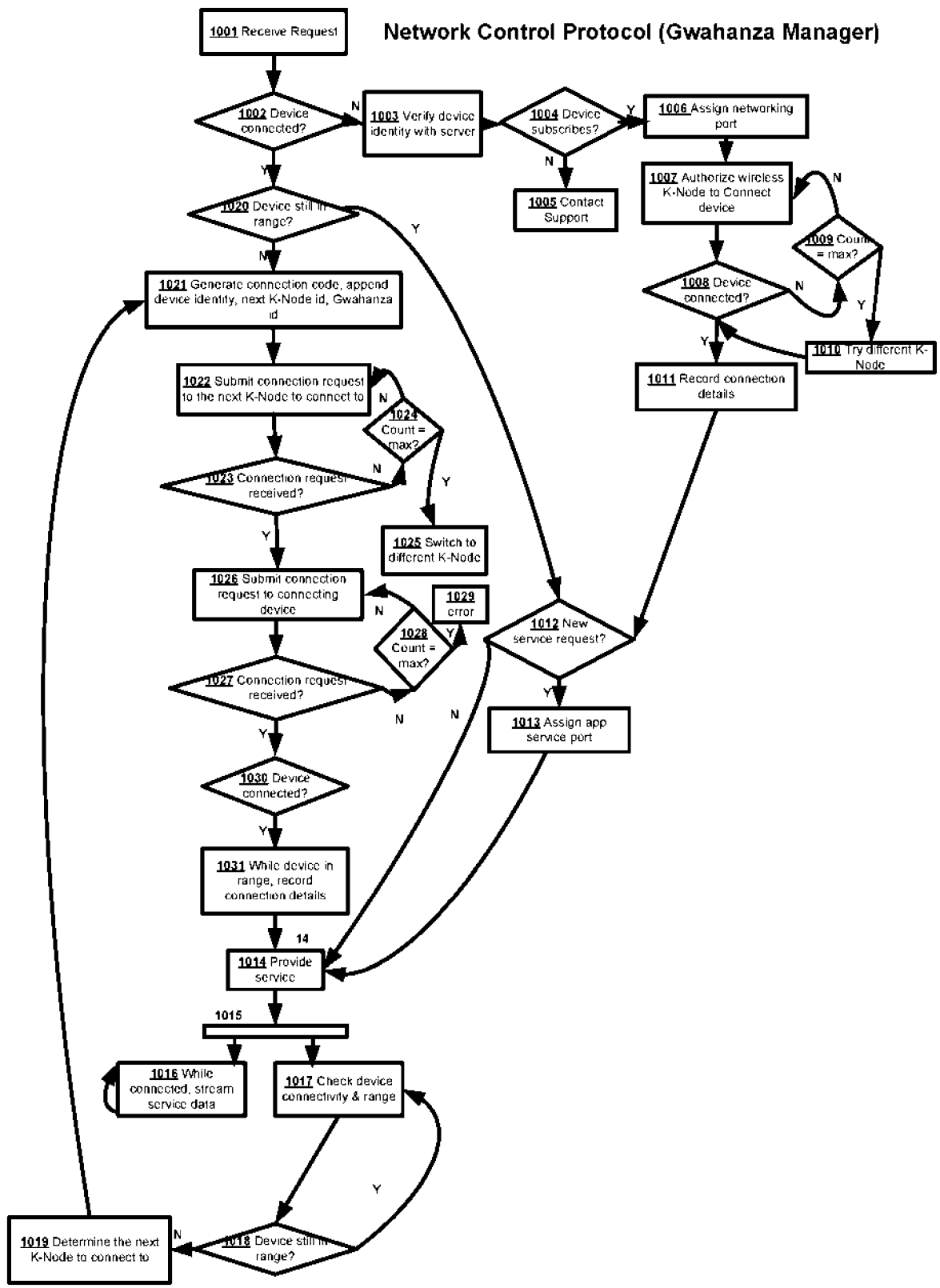
FIG. 10 is the algorithm of the Network Control Protocol. It runs on the Gwahanza Local Area Network Manager to verify and authenticate devices.

The K-Net implements signal transmission as seen in the Network Control Protocol included in this patent application under FIG. 10. The Network control Protocol (NCP) can be installed on a server to run without Gwahanza managers.

Incoming signals 111, 109 are divided into networking signals and data signals.

In one implementation, wireless nodes transmit broadband networking signals at the same frequencies and they all come through the same filter as seen in FIG. 1 (9). Under this implementation, the Mobile Wireless Broadband Network Interface Card (MWBNIC) 100 is instructed to read and filter in specific frequencies or ranges of frequencies while ignoring any other frequencies.

The mobile wireless broadband network Interface card 100 is Instructed by the Packet Control Protocol embedded in it or by the Network Control Protocol on the nearest Gwahanza what node to connect to next based on its position from the nearest nodes. In such a case, calculations are used to obtain relative positions. Alternatively, K-Node performance data is read directly from log tables and utilized in the determination of the next K-node to connect to.

If three data structures (stacks) are utilized in recording incoming data, the writer module writes to stack one and moves onto stack two then stack three. While writing to stack three, the delete module starts deleting stack one. By the time the writer finish writing to stack three, stack one is available for write. Alternatively, multithreading is applied to write and delete to stacks concurrently.

The incoming connection signal also referred to as networking signal, comes through the Frequency Up or Down Converter 105 which matches the frequency of the broadcasting node to connect to. Upon establishing a connection, data is sent to the Demodulator 115 from where carrier wave signal is filtered out and radio data signal converted to digital format for processing.

Upon demodulation, the digital data packets are sent to the Network Packet Controller Chip 116 coupled to the cache 117, modulator 103 and demodulator 115 to control data packets in and out of the mobile wireless broadband network interface card 100. The Network Packet Controller Chip 116 sends the demodulated data through filters and converters 118 to its destinations such as the Communication Ports or display 119.

The MWBNIC 100 simultaneously receives data packets from multiple nodes/net extenders via at least one input port and deletes the old ones while replacing them with the new packets. In order to maintain packet continuity the Network Packet Controller Chip 116 instantaneously saves the last N packets from each of the nodes that are connected to in memory and deletes the previous N data packets. These N packets are always the last ones and are saved in dedicated cache memory 117 or elsewhere for quick access. Old packets are continually deleted. The cache memory 117 may be a dedicated Chip as shown or part of the random access memory 101 or part of the processor. Similarly, the Network Packet Controller Chip 116 may be incorporated into the central processing unit 102

The packet control protocol embedded in the Network Packet Controller Chip 116 pushes data packets onto a data structure such as a stack in cache and pops the data packets from the data structure when it is time for comparison of packets. The packets are identified and compared by packet id. The last data packet stored in memory from the last N packets is compared to the first data packet in a newly connected to K-Node to determine consecutive data packet order. The last packet from a K-Node is set to X−1 and the first packet from the newly connected to K-Node is set to ID=X making it the current data packet.

When the last packet on the previous node is pushed onto a memory stack and compared to the first packet from the new node such that order is maintained, the new node packets are written to that new stack. If three stacks are used at a time, stack X and X−1 are considered current. The oldest stack X−2 is deleted to allow for new data.

FIG. 2 is a slight variation of figure one. Under this architecture, each of the three filters takes a specific frequency range that is different from the other two. The Mobile Wireless Broadband Network Card reads a frequency or frequency range into each of the three filters. In one implementation, it activates data from the nearest node in its direction and this is based on signal strength.

It listens further and connects to a second node whose frequency range matches that of the second filter.

The two nodes are connected simultaneously but they each write data to its own allocated memory space. Data from each filter is directed to its space because it comes from a different node. A module is also assigned to write that data and another to compare data from two wireless nodes. Threads may be utilized to accomplish some of the tasks.

In each case, the card stores the last N packets in different temporary storages. Data packets are compared by packet ID. The packet control protocol pops the last packet to be pushed onto a stack or other storage type and compares the last packet from the oldest node to the packet Id of the first packet on the new node. It sets the oldest packet with id X−1 as previous and the new one with id X as current packet.

Data packets in the mobile wireless broadband network interface card are divided into two categories. One is the networking category that allows a mobile device to move from one Wi-Fi node to another or connect to multiple nodes simultaneously and maintain the data packet order and continuity. The other is the actual data intended for user device. Service data packets in each category are received at different frequencies that are assigned specific ports. The Packet Control Protocol embedded in the MWBNIC 100 maintains order and continuity of packets from different nodes. It compares the packet ID from a previous K-Node to the packet id of the newly connected to K-Node wherein sets a packet with ID X−1 as previous and one with packet ID X as the current data packet.

The communication packets intended for networking devices and nodes are transmitted at their own frequencies different from the actual data transmitted over the network for the user device. In another implementation, the networking packets are flagged and transmitted at the same frequencies through all nodes.

Networking data packets of the wireless broadband network interface card 100 are received from every other node at specific frequencies wherein the connecting Mobile Wireless Broadband Network Interface card 100 easily finds a frequency under which to connect to the next K-Node on the Wi-Fi network showed in FIG. 7 and other broadband networks.

The three filters 207,208 8 and 209 in FIG. 2, each filters in only one or a range of networking data packets. Since every other node broadcasts communication or networking data packets at a different frequency or range of frequency, the nodes in range in a given direction connects automatically each through a different filter. The mobile wireless broadband network interface card does not need help of a Gwahanza LAN Manager to switch nodes under this implementation. Only frequency hopes accomplishes the task of switching nodes though in another implementation, the Gwahanza LAN Manager instructs the device what node to connect to.

Utilizing the auto connection based on frequency hops of the nodes or signal strength, the mobile wireless broadband network interface card reads established tabulated data with positions of all nodes for a given direction and determine which nodes to connect to and which to drop. However, the oldest nodes drop automatically as they get out of range of the networking frequency. Frequency filters establishes the K-Nodes to connect to automatically which allows for simultaneous connections.

The second category is that of the actual service data that a user device needs. This includes television data, videos, telephone, audio and text, navigation, video conference data and so on. Each type of service data received through the mobile wireless broadband network interface card is transmitted at specific ranges of frequencies so that all services flow through simultaneously without interfering with each other. A port is designated to each range of frequencies. Data packets are identified by packet identification (PID) which PID is sequentially incremented and flagged for the data frame. The PID is used in writing the last N data packets to a temporary storage memory from where they are popped for comparison with new packets from a newly connected to node. This temporary storage memory is a dedicated cache but it can also be part of the random access memory or the processor. Packet ID numbers appended to device identification also prevents signal interference when multiple devices are sharing the same space and frequency channels.

As showed in FIG. 7, frequency hop refers to the alternation of frequencies on nodes that broadcast networking data packets. This enables automatic connection based on frequency in use. After establishing a connection, the actual service data packets flow through the mobile wireless broadband network interface card as desired by the auxiliary device connected.

The main difference here from the implementation of FIG. 1 is that each node passes packets in a different filter at different connection frequencies. The connection frequency transmission is alternated at every node and each filter takes a specific frequency or range of frequency to match the current node.

While frequencies of connection packets are alternated for every other router, data packets for each type of data flow at the same dedicated frequencies throughout all the nodes on the Wi-Fi network of FIG. 7 or other broadband networks. That is, if TV signals flow at frequencies of A-C MHz on one node, it will flow through all nodes at those frequencies. If navigation data flows at frequencies of D-G at one K-Node, it will flow through all K-Nodes at that range of frequencies.

FIG. 3 is another variation of FIG. 1. The architecture of FIG. 3 receives and transmits Wi-Fi signal or other signal through one filter 307. The communication frequency is irrelevant but that of the actual data remains the same through all nodes. Switching of nodes from one to another depends entirely on signal strength 322, 313, 314 which is determined by a mechanism coupled to the Network Packet Controller Chip 317 and processor 302. A device connects up to three nodes. Data from each of the K-node router passes through one filter as shown. The mobile wireless broadband network interface card listens to broadcasts from various nodes in range and receives data packets from wireless K-Nodes through at least one communication port. It reads and determines their signal strength after which connects to the one's with the strongest signal in its direction of travel. Service data flows through one K-Node or Net Extender (node) until the MWBNIC device switches to a new node on the Wi-Fi network of FIG. 7 or other broadband network.

The MWBNIC receives signal from the nodes with a time to live attribute in the TCP header. It obtains the time it takes the signal to arrive by subtracting time to leave from arrival time (T=AT−TTL). Multiplying T with signal speed provides device distance from the node. If connected to three nodes, three arbitrary circles are drawn with device distance as the radius. The intersection of those circles provide the coordinates of the device (X,Y). Alternatively, straight lines are drawn between pairs of nodes through the device position generating multiple triangles. The triangles are geometrically utilized to determine any distance required from the nodes. These methods of determining device coordinates and distances are utilized in other devices that we design.

Signal travel time is multiplied by signal speed to get device distance from the K-Nodes connected to. The distances are then utilized to obtain any other data needed such as device coordinates.

The Mobile Wireless Broadband Network Interface Card is assigned a hardware MAC address by which it is identified on the network in addition to its Internet Protocol Address.

Another computation from change of position gives the second position of the device with new coordinates (X−x, Y−y) which tells the direction of motion by looking at which node's distance is increasing or decreasing.

Direction of motion in turn is utilized to determine which nodes to connect to next. [067b] The K-Note broadcasts its presence.

When sending a connection request, the mobile wireless broadband network interface card submits its identifying information and type of device requesting for connection to multiple wireless K-nodes in range. It connects to the nodes with the strongest signal strength until a new node with greater strength is encountered in its direction of travel. After authenticating to the new node, the previous node with the least strength is dropped. It receives data packets from wireless K-Nodes through at least one communication port and determines the strongest signal strength to connection to.

The mobile wireless broadband network interface card connects to the nodes with the strongest signal strength until a new node with greater strength is encountered in its direction of travel dropping the one with the least strength after authenticating to the new node. This is referred to as auto connect.

The original usage of the priority processing field in the TCP header is to prioritize devices with different retransmission times in case a transmission was unsuccessful. In this network, we utilize that field to prioritize devices with critical need to connect over others. Under this usage, a vehicle on a road may have higher priority over a phone device so the network lets the vehicle connect first. Though we use the original field in the TCP header for compatibility with current networks, we alternatively place it anywhere else in the TCP header or in the connecting Internet Address (IP).

A protocol for controlling networking data packets and actual data transferred within a device is developed and named Packet Control Protocol (PCP). It resides in the Mobile Wireless Broadband Network Interface Card (MWBNIC). The Packet Control Protocol in the MWBNIC is coupled to a mechanism for determining bandwidth or signal strength on K-Nodes. It also determines positions of the card relative to the nearby K-Nodes at any time.

The card reads K-Node transmission frequency. Utilizing either signal strength or communication frequency of a particular K-Node, the MWBNIC selects which K-Node to connect to without help from the Gwahanza manager. It periodically downloads a routing table with nodes in the area where it is located.

The mobile wireless broadband network interface card is instructed by the Gwahanza LAN Manager to connect to a next K-Node based on its position from the nearest nodes wherein pre-determined data is utilized to connect. Predetermined data includes location of each K-Node and Gwahanza LAN Manager and any positions between them and signal strength at each location.

Another protocol named Card Control Protocol (CCP) is designed to control activities between the MWBNIC and the wireless K-Nodes The CCP resides in the K-Nodes.

Figure 4:
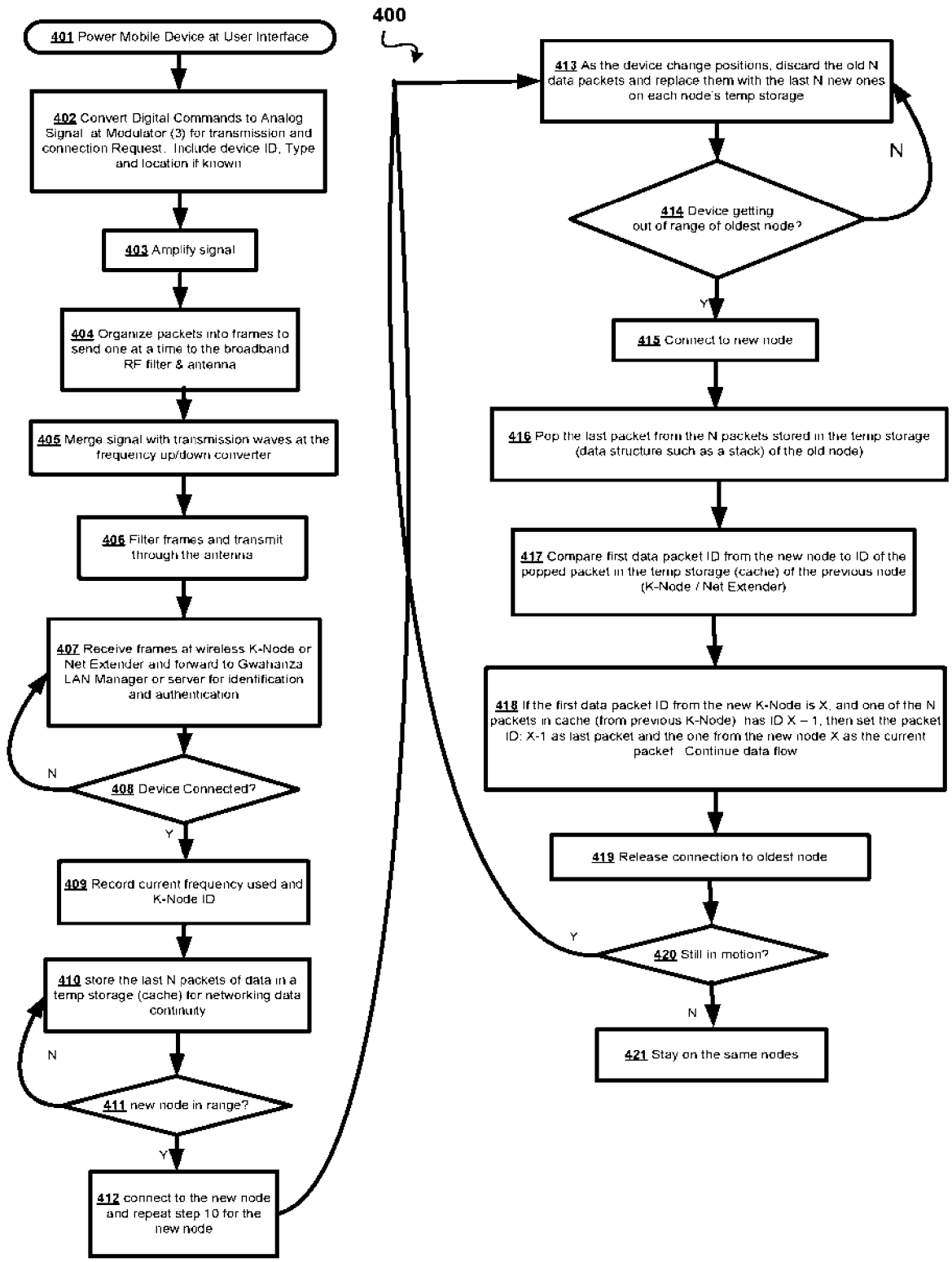
FIG. 4 describes version 1 of the packet control protocol (PCP) algorithm in a flow chart format. The PCP controls data packets in the card and maintains connectivity between wireless K-Nodes on any given local area networks. The card is built into devices but in some cases, it is plugged in via external ports.

The algorithm of FIG. 4 400 represents the Card Control Protocol (CCP) for controlling connectivity of moving devices and data flow on one or more nodes (K-Nodes/net extenders) without losing signal continuity. Utilizing this algorithm, frequency at which a node transmits connection packets plays a role in switching from one wireless router or net extender to the next.

Implementation of the Card Control Protocol depicted by FIG. 4 enables the Gwahanza LAN manager or server dictate which node (wireless router/net extender) the mobile wireless broadband network interface card (MWBNIC) connects to. The MWBNIC does not decide which node to connect to or drop in that implementation.

While in motion, the MWBNIC is instructed each time there is a need for change of node and it connects to a new node. These nodes are pre-configured to broadcast connection signal at specific frequencies which are easily picked up by the Frequency Up or Down converter. For data continuity to take place, the MWBNIC has to be connected to at least two nodes simultaneously.

At power on 401, the Mobile Wireless Broadband Network Interface Card reads signal broadcast from nodes. It sends a request to connect to the nodes. The request which is in form of digital commands, is converted to analog signal 402, by the modulator for transmission. The request includes device ID, type and location if known. The signal is amplified 403, and organized into frames 404, which are merged with transmission waves at the frequency up/down converter 405. This is coupled to the modulator from where the signal is sent one frame at a time through the filter 406 to the antennas for transmission as radio waves.

The network system comes with two network protocols namely Card Control Protocol (CCP) that runs from the K-Nodes and the Network Control Protocol (NCP) that runs from the Gwahanza Local Area Network Manager or server. The system comes with a third protocol namely the Packet Control Protocol (PCP) that runs from the connecting device. The protocols work together to establish a connection.

When a node receive frames from a Mobile Wireless Broadband Network Interface Card device 407, the signal is forwarded to the Gwahanza LAN manager or server for verifying device ID and type of device. It is authenticated upon verification.

Once connected 408, the packet control protocol (PCP) which executes from the Mobile Wireless Broadband Network Interface Card as seen in FIG. 1, records all the data required including frequency and K-Node ID 409. The combined system of protocol and Gwahanza LAN manager records N data packets for each type of service the user accesses at any given time. After the first N packets, the subsequent packets become the last N packets.

As for the last N packets of data stored at any given instance 410, a data structure such as a stack is used. Two or three stacks accomplish this task for each data type. If the system utilizes N to represent 15 data packets, we can use 3 stacks and write 5 packets to each stack. Once the first stack is full and at least one packet is written to the second stack, a delete method or function is called to clear the first stack with the 5 data packets. By the time the second stack is full, the first one is emptied and that is written to again. The process of writing and deleting the packets on stacks continue until there is no more data flowing in. Other data structures, files or databases could be used but a stack is much faster because it is a last on first out structure. The last packet to be written is always on top and it is the first one to be read off for comparison with a packet from a new node. Threads may be utilized to multitask.

If there is a new node in range to connect to 411 and instructed by the Gwahanza LAN manager or server to connect to it, connect to the new node 412.

As the device change positions 413, it discards the old N data packets and replace them with the last N new ones on each node's temp storage. The device simultaneously connects to two or three nodes but sometimes it connects to only one K-Node when there are not enough nodes in range.

Algorithm of the Packet Control Protocol temporarily stores the last N data packets from a connected K-Node at anytime and deletes the previous N data packets from the dedicated memory. This is done to free up memory.

Each data type is allocated its own memory to save the N packets. If the device is connected and different data types such as television, phone and navigation signals are inflowing, as well as network instructions for switching nodes (K-Nodes/net extenders), there can be four different groups of memory allocations. If three stacks are used to store the last N data packets for each type of data, the instructions for switching nodes are allocated different memory areas. Television data is allocated three stacks, phone data is allocated three stacks and navigation data is allocated three stacks. Each data type has its own module that writes to its stacks so one data type does not interfere with writing on other stacks. Multiple threads run concurrently to have many tasks accomplished simultaneously.

If the device with a built in or connected Mobile Wireless Broadband Network Interface Card (MWBNIC) is getting out of range 414, it connects to a new node 415.

When data packets start flowing from a new node (K-Node/net extender), the last packet to be stored on the stack is popped from the temporary storage 416, and compared to the first data packet from the new node 417.

If the current packet from the new node has ID of X and the packed on top of the last stack to be written has ID of X-1, 418, then packet with ID X-1 is set as the last packet and the new packed with ID X is set as the current packet. The data stream continues to flow as if all packets came from the same node.

After establishing data continuity from the old node and the new node, the old node 419, is dropped and its stacks emptied. If the device is still in motion 420, the algorithm loops back to step 413 and continue downwards else stay on the same nodes 421.

Every Gwahanza LAN manager has updated connection data of all nodes in the Sub Wide Area Network (SWAN) and currently connected user devices on the Local Area Network. However, it could as well store identities of local devices. When a user device from a different SWAN connects to a Gwahanza manager that does not have its information because it is located in a different WAN, verification and authentication takes place from the authentication servers.

All functions of the Network Packet Controller Chip are alternatively placed in the microprocessor. Similarly, verification and authentication of the MWBNIC that takes place at the Gwahanza LAN manager could take place at the K-Node level or at the authentication servers.

Figure 5:
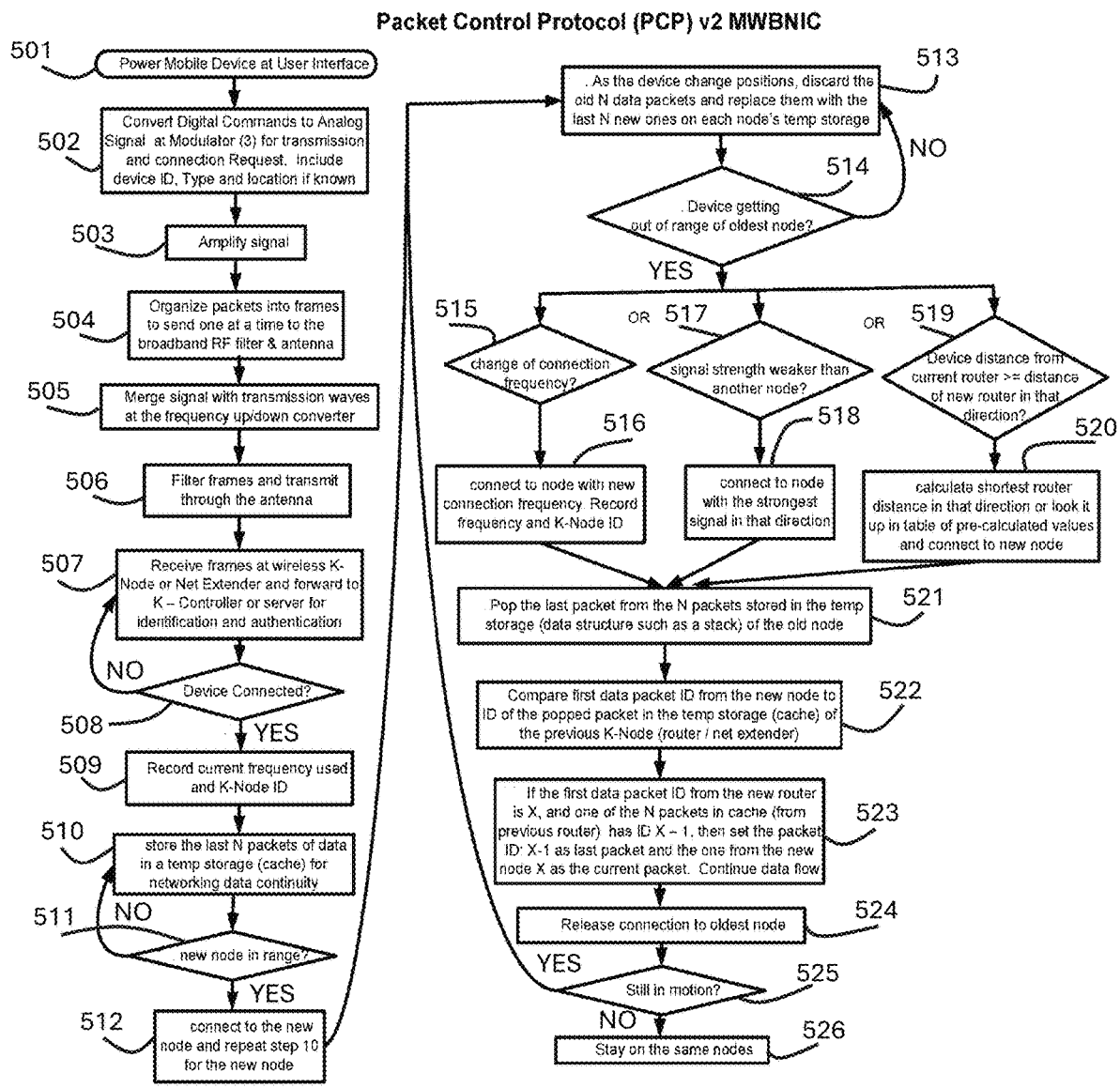
FIG. 5 Shows a second version of the packet control protocol (PCP) algorithm in a flow chart format.

The algorithm of FIG. 5, 500 depicts a different version of the packet control protocol (PCP) that lets the mobile wireless broadband network interface card (MWBNIC) find its own node (K-Node/Net Extender) to connect to. One of the differences between this version and the version of FIG. 4 is that the MWBNIC connects to the wireless nodes without being instructed which to connect to.

The Packet Control Protocol in the Mobile Wireless Broadband Network Interface Card (MWBNIC) is connected to a mechanism for determining bandwidth on nodes. It also determines positions of the card relative to the nearby K-Nodes at any given time. Additionally, the card reads K-Node transmit frequency. Utilizing this data, the MWBNIC selects which K-Node to connect to next without instructions from the Gwahanza LAN manager. It utilizes three different methods as follows.

A bandwidth mechanism for determining bandwidth on nodes [034] comprising a Gwahanza LAN Manager that keeps logs of all devices connected to nodes on its LAN [047],[064],[080],[082],[086],[087] high speed wires that connects the Gwahanza LAN Manager to the wireless nodes namely the K-Nodes and Net-Extenders along with embedded protocols and software [008],[026],[132]. The protocols facilitates authentication, node switching while in motion and data transmission on the network. Authentication times are recorded for different kinds of user devices along with data transfer capacities.

[2], [015], [028], [096], [004], [006]. [007], The user service data is subdivided into categories specifying the types of data being transmitted. Packets in each category are received at different frequencies which are assigned specific communication ports. This allows for all services to flow simultaneously without interference. [013]. The mobile wireless broadband network interface card reads pre-determined and tabulated positions data which provides it with the next node to connect to based on its calculated distance and coordinates [020] and the application monitors, repeaters, authentication servers, Internal DNS servers (IDNS), IP allocation servers, firewalls, Gateway to the internet all connected by wires such as fiber optics that delivers high speed data transmission. A combination of all these with the three protocols makes the network function and the design allows both broadband and narrow bandwidth to provide data and determine bandwidth on nodes. The filter is dual mode meaning it filters narrow band below 2.4 GHz and broad band 2.4 GHz-5.x GHz, Microwaves and Infrared utilized one at a time. Amplifiers 4, 14 are utilized to enhance incoming and outgoing signal. The incoming broadband signal 9 from a wireless K-Node and all other signals pass through the antenna 12 coupled to the duplex filters. [028],[016],[034],[035]. The mechanism is coupled to the Network Packet Controller and processor in the MWBNIC for switching nodes [042].

A signal mechanism for determining signal strength at wireless nodes on the K-Net network comprising pre-determined values stored on the card or read from the Gwahanza LAN manager. [020]. The Gwahanzas store logs of all wireless nodes on their local area network. These logs include but not limited to geolocations of all the wireless K-Nodes and radius under which they perform well. When a Mobile Wireless Broadband Network Interface Card requests for a connection, or move to a new location where it is going out of range of the current connection, the Gwahanza reads the logs and determines which wireless node is to sustain the MWBNIC based on its current position and direction. [133],[134], [135] and [136]

The MWBNIC goes through steps 401-413 of the FIG. 4 algorithm. When the device is getting out of range of the currently connected to node 14, it proceeds to connect to a new node based on the method of choice 415, 417 or 419.

The Packet Control Protocol is characterized by different memory locations and modules for each data type that is delivered during device hop from one K-Node to another.

If the implementation is one that depends on nodes changing transmission frequencies of communication packets, 415, a frequency change is detected and matched in the device to switch to a new node. The device establishes connection with the new node at the new frequency 416.

If the implementation is one that depends on signal strength to switch from a node to another, 417, the mobile wireless broadband network interface card reads signal strengths of all nodes in range and selects the best three to connect to 418. To ensure they are the right nodes to connect to, the device finds its own direction and selects nodes that are in that direction. Methods of determining device distance from nodes, coordinates (x,y) and direction are established under the algorithm of FIG. 3.

In another implementation, the device depends on pre calculated and established values to choose nodes to connect to 419. Based on device position (x,y), the device looks up routers with established connection range that is tabulate and it connects to those routers. The pre-calculated and tabulated data saved in memory of the MWBNIC is updated periodically to read positions of nodes and distances of its location relative to the nodes. A device can also calculate its distance from the nodes and use the distance to determine which nodes to connect to 420.

Methods of determining device distance from nodes, coordinates (x,y) and direction are established under the algorithms of FIGS. 4, 5 and 6.

The MWBNIC calculates its position and direction of motion. It calculates this from location of each node from three different nodes. Using its coordinate (x,y,z) and particularly the x value as the end point from the center of the node and distance x between them, it draws an arbitrary circle around each of the nodes. The intersection of circles provides coordinates of the device.

In all the three methods above 514, 515, 516 or 514, 517, 518 or 514, 519, 520, the mobile wireless broadband network interface card (MWBNIC) device looks for the nodes and connects by itself without being instructed. It reads broadcasted signals from the nodes and connect to one or more nodes at the same time.

When data packets start flowing from a new K-Node/net extender, the last packet to be stored on the stack is popped from the temporary storage 521, and compared to the first data packet from the new node 522.

If the current packet from the new node has ID of X and the packed on top of the last stack to be written has ID of X–1, 523, then packet with ID X–1 is set as the last packet and the new packed with ID X is set as the current packet. The data stream continues to flow as if all packets came from the same node. The data port set as current or active for device data utilize a data structure that is first-in first-out such as a queue. A stack which is a last-in last-out, stores secondary data for comparison. Two, three or more stacks are utilized to store data from a secondary K-Node that is about to become the next K-Node.

Service data of each kind is assigned to a specific port which port is associated with specific frequency ranges. One device can run multiple applications without interference from each other.

After networking, an application opened on a device submits a request stating the type of service needed. The Network Control Protocol in the Gwahanza LAN manager assigns an application port for both the device and Gwahanza connection. If the device happens to be in motion, the port stays constant until the device is disconnected. When switching data sources (K-Nodes), the port and other connection info is forwarded to the new K-Node. With reference to the connecting device, the port connects at a specific range of frequencies to avoid interference from other applications running on the same device. Alternatively, a new port is issued at each new connection.

After establishing data continuity from the old node and the new node, the old node 524, is dropped and its stacks emptied. If the device is still in motion 525, the algorithm loops back to step 513 and continue downwards else stay on the same nodes 526.

To check if the MWBNIC is still in motion, two variables are declared. Current distance and new distance and are both set to zero. Current distance is calculated and set to actual distance. After a change of position, the new distance is calculated and assigned to the new distance variable. This is done for all connections to nodes. The direction that decreases most distance between the device and node becomes current direction that is N, NNE, NE, EN, EEN, E.

FIG. 6, 600 is a representation of a data structure in a tabular form. The data structure could be a harsh table, list or other that allows quick data access in the random memory. It is used in conjunction with the algorithm of FIG. 5. In one implementation, data resides on the user device (MWBNIC) and in another implementation; data is retrieved from the Gwahanza local area network manager or server on the network. The tabular form shows a gateway to the internet, 1 that a device is connected to. Utilizing routing tables, the gateway easily identifies the Wide Area Network (WAN) 2 where the user device is located. To further narrow the search, identification (ID) of the Gwahanza LAN manager 3 on which the Network Control Protocol resides is used. This narrows the search to only the nodes that are connected to that Gwahanza LAN manager. After locating the Gwahanza on which the user is located, the algorithm reads the actual node the user device is connected to since a log of nodes is kept on the Gwahanza LAN manager when a device is in motion. Distance of the node 8 is used with two other distances from two other nodes to determine coordinates of the device. Utilizing device coordinates and direction, the algorithm reads the next node to connect to from the tabular data. Not shown in the attributes is the speed of the MWBNIC.

Alternatively, the packet control protocol algorithm calculates distances from three nodes and its direction of travel then draw arbitrary circles whose intersection provides the (x, y) coordinates of the device. At any given device coordinate, the algorithm reads the next node, 7, to connect to in that direction from the table by comparing to the coordinate, 5 in FIG. 6. Not showed is the average speed of the device which is also tabulated. It is obtained from distance covered divided by elapsed time St=D It In the setup of FIG. 6, 600 switching a wireless router to connect to the next one depends on real time calculated values by the device or pre-calculated and tabulated values that are stored and accessed. The pre-calculated values may reside on the server and accessed remotely. In another implementation, these values resides on the device such that they are just called upon to direct the device on which node to connect to and which direction to take based on current device coordinates.

These pre-calculated values include all positions of nodes and Gwahanza LAN managers. They also include coordinates of all the positions in between the nodes in increments of one meter or less. To obtain these lengths, the algorithm table 600 utilizes positions of nodes relative to longitude and latitudes in the vicinity of Gwahanza LAN managers. Degrees are converted into distances and tabulated. Distances and angles of the nodes are utilized in conjunction with device speed and signal speed hence direction is calculated.

FIG. 7. Shows a network of wireless nodes 701 on a Wi-Fi network, coupled to Gwahanza LAN managers, 2 by wires not shown. Gwahanzas are in turn connected to servers (not shown) by wires. The figure also shows Net Extenders 4, which are user devices that resides in homes or offices to provide network extension. The net extenders which connects to K-Node routers and Gwahanza LAN Managers by wires and wirelessly, broadcast their presence to devices that run the packet control protocol. Those devices connect to the net extenders wirelessly. The Card Control Protocol on the K-Nodes and Net extenders, networks and transfers devices from other Net Extenders and K-Node routers to maintain continuity of data packets while in motion. The network extender also has physical output ports that are connected to by Ethernet, Fiber, HDMI and USB devices to transfer data.

Subscribed Net Extenders are used from anywhere they can get access to the network. Number 703, is a picture of a device with a built in mobile wireless broadband network interface card (MWBNIC) to access service. The MWBNIC has versions that are pluggable into ports such as USB to provide connectivity to other devices on a broadband spectrum. Functions of the Gwahanza LAN manager, 702, are transferred to a server if the wireless nodes are found to have reasonable ranges.

F1, F2, F3, F4 and F5 shown in 701 above the various nodes lies in a category of frequencies utilized to connect mobile wireless broadband network interface cards to nodes. These frequencies are different from the frequencies at which service data flows. The network frequencies are interchanged at every node so that neighboring nodes do not broadcast at the same frequencies to attract the same device at the same time. This helps the device to automatically connect to the nearest frequency in range. The implementation of FIG. 2 which provides more than one filter whereby each filters only one frequency or range of frequency enables two or three nodes to be connected at the same time.

In the network of FIG. 7, 700 flat antennas, 705, are coupled to Gwahanza LAN managers 702 to harvest free television channels in the air. The signal is demodulated to digital for television consumption. These channels becomes accessible to all devices that have this MWBNIC 703 built in or plugged in via a communication port such as USB or Firewire. The television signals are collected and distributed in real time and saved as well for later distribution. Like all other services, the television service has its category of frequencies that allows all types of data to flow simultaneously without interference each other. The Wireless Broadband Network Interface Card is built with at least one external port that connects to wires including fiber optics.

Some of the Gwahanzas 702, of FIG. 7 are connected to line of site dish antennas 706, that receives data signals from other antennas 707 using microwave radio transmission or other signal types. The dish antennas connected to Gwahanzas 702 are placed on higher ground and utilized to bridge signal across rivers, mountains or places where it is difficult to run fiber wires.

The nodes in FIG. 7, 700 have either F1, F2, F3, F4 or F5 on them as networking frequencies. This is frequency hop which refers to the alternation of frequencies on nodes that broadcast networking data packets. The purpose is to enable automatic device connection based on frequency in use. Up to five networking frequencies are utilized because there can only be five nodes in each node's neighborhood. That is, every four nodes surrounding one node and overlaps its connection range must be at different frequencies. Direction of travel determines the two or three nodes 701 to connect to at any given time.

FIG. 8, 800 represents a Local Area Wireless Broadband Network (LAWBN) comprised of a connected device 801 with a Mobile Wireless Broadband Network Interface Card (MWBNIC) for authenticating and networking. The MWBNIC in the mobile device 801 is connected through a wireless transmission 802 to a data source (K-Node) 803*a*. The K-Node is connected to the Gwahanza Local Area Network Manager 805 via a high speed data wire 802, represented by dotted lines (from 803*a* to 803*b*). The Local Area Network Managed by the Gwahanza is also comprised of other wireless K-Nodes 803 independently connected to the Gwahanza 805 by wires 804. Each K-Node is directly connected to the Gwahanza with a designated wire. The wires are fiber optics or other that delivers high speed data transmission.

Prior to connecting, a device submits it's connection request which includes its identity. The device identity is comprised of its MAC Address, IP Address and other data such as its location (x,y,z), phone number. The K-Node appends its id and forwards that information to the nearest Gwahanza Local Area Network manager with attached K-Nodes 803.

The Gwahanza 805 verifies the device identity from the servers and authenticates the device 801. The device 801 then connects through the wireless K-Node 803*b* to which it sent the connection request. The Gwahanza 805 which is characterized by a Network Control Protocol provides connection ports and records the connection.

The log includes the device's 801 current location, direction of motion relative to the wireless K-Nodes 802*b* within range, the current local area network WAN, the current K-Node 803*b* connected to, K-Node distance, time, the current network connection port and any application ports assigned by the Gwahanza 805. The Gwahanza 805 establishes the next K-Node 803 and adds it to the log for swift retrieval when needed. The next K-Node 803 changes when the device 801 changes direction.

When the device 801 is getting out of the Gwahanza's 805 local area network range, the Gwahanza 805 reads the routing table and forwards the device 801 to the next Ghahanza 805 Network Manager which acts as a server. When a device 801 is getting out of range of a K-Node 803*a* currently connected to, the Gwahanza 805 generates a connection code and appends it to the device's 801 identity to create a connection request to a new K-Node 803*b*. The connection request includes the next K-Node 803*b* to connect to as the interface, the Gwahanza's 805 id, the device 801 identity and the randomly generated connection code. The modem is instructed by the Gwahanza LAN Manager 805 what node to connect to next utilizing frequency of the broadcasting K-Node 802*b* in range or signal strength and a connection code.

The connection request is submitted by the Gwahanza 805 to the next K-Node to connect to 803*b* via a wire represented by dotted lines of mixed length dots 806. This is from Gwahanza 805 to the wireless K-Node 803*b*. That way, the next K-Node 803*b* expects an incoming connection request. We notice that the dotted line 806 between the mobile device 1 and the K-Node 803*b* is bidirectional.

The connection request submitted to the next K-Node to connect to 803*b* in FIG. 8, 800 is also sent to the connecting device 801 via the wire 802 with dotted lines and the wireless K-Node currently connected to 803*a*.

Upon receiving the connection request, the connecting device 801 broadcasts it to nearby K-Nodes 803. The K-Nodes in range peaks at the header which includes id of the next K-Node 803*b* and ignores the request when it doesn't belong to them. Only the K-Node 803 whose id is the same as that one in the connection request authenticates the device. The next K-Node 803*b* to connect to retrieves the request it received from the Gwahanza 805 and compares it to the one from the connecting device then authenticates the device 801 to switch to that new K-Node 803*b*. This is a highly secure method of connecting and switching nodes. Data is strictly directed to the device with specifics that only that device can provide to authenticate. The connection code changes for every connection request.

The Gwahanza 805 generates a connection code 806 that it appends to the connecting device's identity along with the Gwahanza's id and the next K-Node id to submit via a wire 804 to the next K-Node 803*b* as a connection request for authentication. It submits the same connection request to the connecting device via the K-Node 803a it is currently connected to wherein the device broadcasts the connection request over a Wi-Fi network or other broadband network. The connection request is picked and processed by the next K-Node 803b for authentication and service.

A connection request sent to multiple wireless K-Nodes 802 in range for authentication includes device identity and the type of device requesting for connectivity. Service request includes type of application for port designation. The service providing server or website provides a service code to the device. The service code is a onetime use. Each service request gets a new code.

In another implementation, type of device field is placed in the connecting IP address of the device 801. After connection, type of service sought is associated with a communication port at specific frequency ranges.

In the implementation where the MWBNIC is in charge of selecting the next K-Node 803b, the next K-Node 803b to connect to is selected based on current relative position of the device and its distance from the K-Node 803b in terms of signal range. Alternatively, it is selected based on wavelength at which the K-Node 803b interacts with devices and hence subsequent frequency.

Whether the Gwahanza Local Area Network Manager 805 controls the connections or the MWBNIC, the K-Node 803b the device connects to is read from the pre-determined positions and signal strength logged on the MWBNIC or the Gwahanza 805. The positions and signal strengths are also obtained by calculations based on the available parameters.

The Mobile Wireless Broadband Network Interface Card stores temporary connection data from the network in its memory. The data is stored in a mini database in one implementation and in another implementation connection data is stored in a file placed in memory such as flush. It is retrieved to physical memory prior to completing authentications and networking. The MWBNIC interacts with a mini database or file on the card that stores temporary information from the network wherein data stored in this database or file is utilized to complete authentication and a network connection.

The Packet Control Protocol software of the Mobile Wireless Broadband Network Interface Card interacts with the mini database on the card that stores temporary information from the network. The data is utilized to complete network connections and switching from one K-Node to another. Similarly, the software accesses the data when the data is stored in a file instead of a database.

The Gwahanza 805 establishes a small local area network (LAN) comprised of itself the manager, several wireless K-Nodes connected to it by high speed wires such as fiber optics and the connecting devices.

The Gwahanzas store logs of all wireless nodes on their local area network. These logs include but not limited to geo-locations of all the wireless K-Nodes and radius under which they perform well.

When a Mobile Wireless Broadband Network Interface Card requests for a connection, or move to a new location where it is going out of range of the current connection, the Gwahanza reads the logs and determines which wireless node is to sustain the MWBNIC based on its current position and direction.

In one implementation, the Gwahanza 805 receives signal from the MWBNIC via a K-Node and utilize arrival time of the signal, time to live (TTL) and time spent on the way in relation to nearby wireless nodes to calculate position of the connecting device. However, it keeps a routing table or log of all the K-Nodes it serves and values of signal strength corresponding to each location it serves.

In another implementation, the MWBNIC calculates its own position based on the signals it receives from the nearby wireless nodes to determine its coordinates. In that case, time=time to leave (TTL)-arrival time (AT). Distance=signal speed x time. Utilizing at least three K-Nodes with known positions, it determines its own position. It then sends its coordinates along with other identifying data to the Gwahanza 805 to guide its motion or guide its own destiny by connecting and disconnecting from all the K-Nodes it goes through.

K-Nodes 803a, 803b and 803 broadcasts their presence. The mobile wireless broadband network interface card receives data packets broadcasted by nodes with a time to leave attribute and utilizes arrival time to determine the signal travel time wherein, multiplication of signal travel time with signal speed provides node distance and hence coordinates which are utilized in determining which node to connect to. The said Gwahanza 805 receives device connection request from a wireless node via cable and verifies the device by reading device records on server wherein temporary network data is stored on the Mobile Wireless Broadband Network Interface Card.

The Gwahanza 805 also receives service requests from connecting devices and assigns data ports based on type of service requested wherein the Network Control Protocol in the Gwahanza LAN manager 805 assigns an application port for both the device 801 and Gwahanza connection.

The K-Nodes 803a, 803b, and 803 showed in FIG. 8, are built with identifiers that distinguish them when they transmit data to the Packet Control Protocol of the Mobile Wireless Broadband Network Interface Card. The PCP wherein establishes connectivity by comparing the identifiers of the K-Nodes 803a, 803b, and 803 to connect to and saving the incoming signal from those nodes to buffer for authentication and process.

Figure 9:
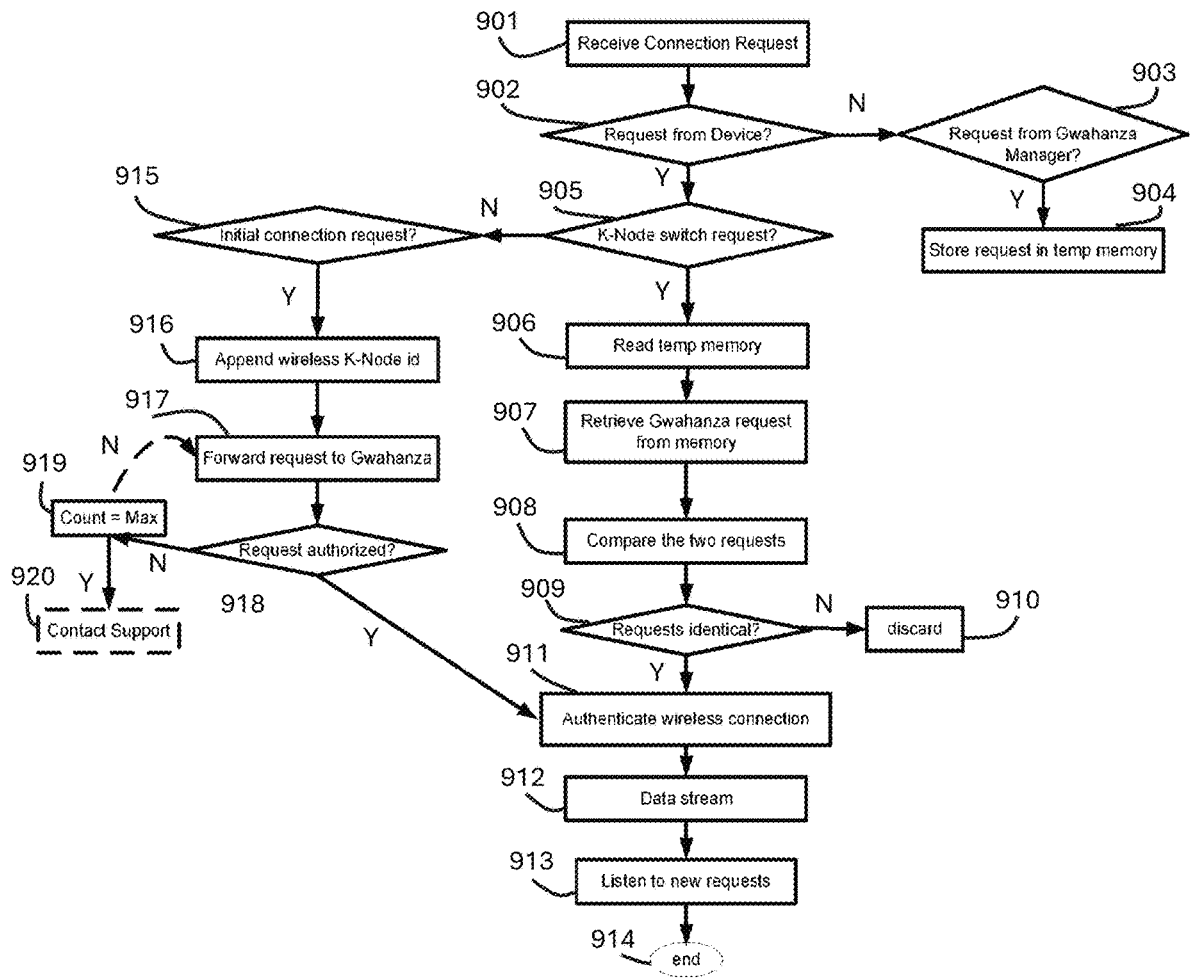
FIG. 9 represents algorithm of the Card Control Protocol which runs on the K-Node to process data traffic between devices and the Gwahanza manager.

FIG. 9, 900 is the algorithm of the Card Control Protocol (CCP) that runs on the K-Node and Net Extender. Instruction 901 receives connection requests. At instruction 902, the algorithm checks if request is not from device 903. That means it is from the Gwahanza Local Area Network Manager. It stores the request in memory 904 for authentication. If at instruction 902, the request is from a device over the Wi-Fi network of FIG. 7 and FIG. 8, it is forwarded to instruction 905 which checks to see if the request is an instruction from the Gwahanza to switch to the K-Node or Net Extender. If the instruction is for switching node, step 906 retrieves what was stored in memory 907 and compares to the new request from the MWBNIC device in motion 908. Instruction 909 checks to see if the two requests are identical. If the requests are not identical, the one from the device is discarded 910. If the device and Gwahanza requests 911 are identical, the device is authenticated and a K-Node or Net Extender switch takes place. Data stream follows 912. The protocol continues to listen to new requests 913. The protocol handles multiple requests simultaneously utilizing threads or several designated modules. It ends at instruction 914. If however the protocol found the request at instruction 5 to be a first time connection request 915, it appends the id of that K-Node 916 and forwards the request to the Gwahanza Local Area Network Manager to verify device subscription with the server 917. If the device request is found authentic 918, it is authenticated 911. Else if the device does not subscribe to the service, the K-Node tries another time 919 before referring the user to customer support 920.

FIG. 10, 1000 is the algorithm for the Network Control Protocol (NCP) that runs from the Gwahanza Local Area Network Manager. Instruction 1001 receives requests and checks to see if the requesting device 1002 is connected. If it is not connected 1003, instruction 1003 verifies the device identity with the server. If the device does not subscribe 1004, it is referred to customer support 1005. If the device subscribes, it is assigned a networking port 1006 and authorization is sent to the requesting wireless K-Node to authenticate 1007. Instruction 008 checks if the device is connected after authorization. If not connected, the authorization is re-submitted 1009. A count is established up to N trial times. If the number of count reaches the maximum N, the authorization is sent to a different K-Node 1010 or Net Extender in range and that K-Node or Net Extender is noted as non-functional. It is pinged and reported to tech support.

If the device with the MWBNIC is connected after authorization 1011, the Gwahanza LAN Manager records connection details including the current K-Node connected to, device coordinates, motion direction, network port and time. If connected to any service applications, the applications and App service ports are recorded. In addition system usage is updated for routing purposes.

If the connected device requests for service via an application 1012, the Network Control Protocol in the Gwahanza LAN manager assigns an application port for both the device and Gwahanza connection. Service Port 1013 is assigned to the particular service. That port is set to a designated range of frequencies to prevent interference from other apps running on the same device. Service is provided 1014. Instruction 1015 allows two processes namely data flow and network range check to take place concurrently.

One process may establish more than one simultaneous connection. Service data is transferred 1016 while the other process is checking to ensure device connectivity is continuous and in proper range 1017.

If the device is still in range 1018, the instructions continue checking in a loop. Concurrence is executed by multiple threads, several modules or other means.

If the device happens to be in motion, the port stays constant until the device is disconnected. When the device gets to the minimum allowable packet transfer rate or pre-determined range zone, instruction 1019 determines the next K-Node or Net Extender to connect to and switch the connection to a different node to maintain data packet continuity. When switching K-Nodes, the port and other connection info is forwarded to the new K-Node. With reference to the connecting device, the port connects at a specific range of frequencies to avoid interference from applications running on the same device and other devices.

At instruction 1021, the protocol generates a new connection code and appends it to the device identity, the id of the next K-Node to connect to, and the Gwahanza id. The device identity includes its MAC Address, IP Address and other data for identification and authentication. This makes up what is referred to as a connection request. The connection code can be provided independently. The connection code is stored until the next authentication.

The connection request is now submitted to a new K-Node to connect to 1022. If the connection request 1023 is not received, a count 1024 is established. If count gets to maximum allowed, the protocol switches to a new K-Node to connect to 1025. Once the connection request is received, the Gwahanza also submits it to the connecting device 1026. If the connection request 1027 is not received by the device, a count 1028 is established. When the count of resends gets to the maximum allowed, an error 1029 is generated and device is disconnected. If the device is still connected 1030, the protocol receives data while connected and records the connection details 1031.

Not shown are steps for packet encryption, compression, decryption and verification with server.

What is claimed:

1. A network packet controller chip for controlling data packets, and networking electronic devices and broadband nodes to deliver data in a mobile wireless broadband network interface card (MWBNIC) device wherein the network packet controller chip runs an embedded packet control protocol, wherein the packet control protocol comprises data structures, temporarily stores a last N data packets from a connected K-Node at anytime and deletes a previous N data packets in a dedicated memory, wherein new data packets replace deleted packets for packet continuity, wherein the network packet controller chip comprises different memory locations and modules, wherein the embedded packet control protocol, allocates different memory areas for each data type that is delivered during device hop from one K-Node to another, wherein said data types comprise networking and user device service data packets, wherein the packet control protocol is further configured to execute from the network packet controller chip in the MWBNIC device and identify data packets by packet ID, wherein the next packet selected for processing comprises an ID of a higher magnitude than the previous one, and wherein the packet control protocol is configured to maintain order and continuity of packets from different nodes and compare the packet ID from a previous K-Node to the packet ID of the newly connected to K-Node, wherein said packet control protocol sets a packet with ID X−1 as previous data packet and one with packet ID X as current data packet.

2. The network packet controller chip of claim 1, wherein the packet control protocol further configured to push data packets onto at least one data structure in cache and pop the last packet for comparison to the first data packet from a newly connected to K-Node, wherein said packet control protocol maintains packet order based on at least one of a packet Id, a K-Node ID and a frequency, wherein the MWBNIC is configured to connect wirelessly over at least one of a wi-fi, a cellular, a microwave and other wireless spectrums.

3. The network packet controller chip of claim 2, wherein the network packet controller chip, networks at least one of a mobile device, a television and a vehicle with at least one wireless node to maintain data packet continuity.

4. The network packet controller chip of claim 3 being configured to execute from the MWBNIC device, wherein the MWBNIC is built as a modem in auxiliary devices or utilized as a plug and play modem for the auxiliary devices, wherein the auxiliary devices include at least one of a mobile device, a television and a vehicle.

5. The network packet controller chip of claim 1, wherein the packet control protocol is configured to interact with a mini database on the MWBNIC device that stores temporary information from the network, wherein said data stored in the database is utilized to complete a network connection.

6. The network packet controller chip of claim 1, wherein the packet control protocol is configured to interact with a file on the MWBNIC device that stores temporary information from the network, wherein the data stored in the file is utilized to complete a network connection.

* * * * *